US006955116B2

(12) United States Patent
Hale (10) Patent No.: US 6,955,116 B2
(45) Date of Patent: Oct. 18, 2005

(54) BEVERAGE DISPENSING MACHINE INCLUDING CARTRIDGE EJECTOR ASSEMBLY

(76) Inventor: Robert Hale, 40 Ridgetop Road, Scarborough, Ontario (CA), M1R 4G3

( * ) Notice: Subject to any disclaimer, the term of this patent is extended or adjusted under 35 U.S.C. 154(b) by 124 days.

(21) Appl. No.: 10/460,305

(22) Filed: Jun. 13, 2003

(65) Prior Publication Data

US 2004/0250686 A1 Dec. 16, 2004

(51) Int. Cl.[7] ............................................. A47J 31/40
(52) U.S. Cl. ...................................... 99/295; 99/289 R
(58) Field of Search ............................... 99/295, 289 R, 99/289 P (56) References Cited

U.S. PATENT DOCUMENTS

| | | | | |
|---|---|---|---|---|
| 2,783,704 A | | 3/1957 | Liebelt | 99/295 |
| 2,905,075 A | | 9/1959 | Liebelt | 99/295 |
| 2,952,202 A | * | 9/1960 | Renner et al. | 99/289 R |
| 3,292,527 A | | 12/1966 | Stasse | 99/295 |
| 3,607,297 A | | 9/1971 | Fasano | 99/28 |
| 3,628,444 A | | 12/1971 | Mazza | 99/275 |
| 4,136,202 A | | 1/1979 | Favre | 426/77 |
| 4,579,048 A | | 4/1986 | Stover | 99/280 |
| 4,846,052 A | | 7/1989 | Favre et al. | 99/295 |
| 4,921,712 A | | 5/1990 | Malmquist | 426/77 |
| 5,197,374 A | | 3/1993 | Fond | 99/295 |
| 5,242,702 A | | 9/1993 | Fond | 426/433 |
| 5,398,595 A | | 3/1995 | Fond et al. | 99/295 |
| 5,398,596 A | | 3/1995 | Fond | 99/295 |
| 5,472,719 A | | 12/1995 | Favre | 426/77 |
| 5,656,316 A | | 8/1997 | Fond et al. | |
| 5,773,067 A | | 6/1998 | Freychet et al. | 426/506 |
| 5,826,492 A | | 10/1998 | Fond et al. | 99/295 |
| 5,840,189 A | | 11/1998 | Sylvan et al. | |
| D408,679 S | | 4/1999 | Potts et al. | D7/309 |
| 6,026,732 A | | 2/2000 | Kollep et al. | 99/295 |
| 6,082,247 A | | 7/2000 | Beaulicu | 99/302 |
| 6,182,554 B1 | | 2/2001 | Beaulieu et al. | 99/289 |
| 6,606,938 B2 | * | 8/2003 | Taylor | 99/295 |
| 6,644,173 B2 | * | 11/2003 | Lazaris et al. | 99/295 |
| 2003/0071056 A1 | | 4/2003 | Hale | |

FOREIGN PATENT DOCUMENTS

| EP | 0 540 440 A1 | 5/1993 |
|---|---|---|
| EP | 1 00 574 A1 | 5/2000 |
| EP | 1 101 430 A1 | 5/2001 |

* cited by examiner

Primary Examiner—Reginald L. Alexander
(74) Attorney, Agent, or Firm—Breneman & Georges (57) ABSTRACT

A beverage dispensing apparatus for extracting beverage from a cartridge includes a slide assembly including a cartridge holder for receiving the cartridge. The slide assembly is used for moving the cartridge holder from a loading position to a loaded position. An injection assembly is coupled to the slide assembly, and includes an injector movable relative to the slide assembly. The injector is movable into and out of an injection position, for piercing the cartridge to inject a liquid into the cartridge. A driving assembly is coupled to the injection assembly for moving the injection assembly into and out of the injection position. An extraction mechanism cooperates with the cartridge holder and includes an extractor that is movable between an extraction position for piercing the cartridge and extracting the beverage, and a non-use position.

20 Claims, 5 Drawing Sheets

BEVERAGE DISPENSING MACHINE INCLUDING CARTRIDGE EJECTOR ASSEMBLY

FIELD OF THE INVENTION

The present invention relates to beverage dispensing machines, and in particular to a cartridge ejector mechanism for a beverage dispensing machine.

BACKGROUND OF THE INVENTION

Single serving beverage dispensing machines are very popular because they provide a fresh tasting beverage quickly without having to produce multiple servings. Single serving beverages such as coffee are typically produced by beverage dispensing machines that use beverage cartridges holding beverage products.

When operating a beverage dispensing machine of this nature, a user typically loads a new cartridge into a cartridge holder located in a slide mechanism and slides the mechanism into place. Once in place, the beverage making process can begin. Generally, a liquid under pressure is injected into the cartridge through the beverage product and the beverage is extracted from the bottom of the cartridge.

Following production of the beverage, the used cartridge must be ejected. Existing methods of cartridge ejection can be unreliable. Some methods rely on gravity to dislodge the cartridge by flipping over the cartridge holder. The cartridge may not fall out of the cartridge holder easily if the cartridge and cartridge holder are not completely clean and free of debris. Therefore, it is desirable to produce a reliable cartridge ejector mechanism.

Additionally, typical beverage dispensing machines of this nature do not have a means to stop a user from retracting the slide mechanism during the operation of the machine. In the case that a user accidentally pulls the cartridge out of position, the process will be forced to stop mid-cycle. It is possible that the equipment may become jammed or damaged during this process.

Also, typical beverage dispensing machines have an injector and an extractor that are parallel to each other and therefore enter the bottom of the cartridge in parallel alignment. The distance that the extractor travels and enters the cartridge must be closely controlled to avoid puncturing the filter element in the cartridge and contaminating the extractor or the brewed beverage with the powdered beverage contained in the cartridge.

Conventional beverage dispensing machines include a liquid injector made of a cylindrical pin with a fluid flow path through the length of the injector pin and having a closed end. Holes extend through the sides of the injector pin to provide an outlet for the liquid. The liquid is ejected from the outlet, under pressure and is forcefully directed to the area adjacent the holes in the injector pin. Thus, the liquid is ejected into the adjacent area rather than directed throughout the cartridge. This results in incomplete mixing with the beverage product and inefficient brewing.

As stated above, conventional beverage dispensing machines inject a liquid under pressure into the cartridge through the beverage product and the beverage is extracted from the bottom of the cartridge. In these machines, the extraction and delivery systems can become contaminated with residual beverage product thereby causing flavor from a beverage product used in one cycle of the machine, to be imparted to the beverage brewed during the next cycle of the machine. In some cases this may be an objectionable or unwanted flavor.

It is therefore an object of an aspect of the present invention to provide a novel beverage dispensing apparatus to obviate or mitigate at least some of the disadvantages of the prior art.

SUMMARY OF THE INVENTION

In one aspect of the present invention, there is provided a beverage dispensing apparatus for extracting beverage from a cartridge includes a slide assembly including a cartridge holder for receiving the cartridge. The slide assembly is used for moving the cartridge holder from a loading position to a loaded position. An injection assembly is coupled to the slide assembly, and includes an injector movable relative to the slide assembly. The injector is movable into and out of an injection position, for piercing the cartridge to inject a liquid into the cartridge. A driving assembly is coupled to the injection assembly for moving the injection assembly into and out of the injection position. An extraction mechanism cooperates with the cartridge holder and includes an extractor that is movable between an extraction position for piercing the cartridge and extracting the beverage, and a non-use position.

Advantageously, the aspects of the present invention provide a beverage dispensing apparatus with an ejection mechanism for easily ejecting used cartridges from the apparatus by permitting the cartridge holder to slide out from supporting the cartridge. In another aspect, the extractor enters a sidewall of the cartridge, between the filter and the bottom wall of the cartridge. In yet another aspect, the injector pin is designed for spreading the injected flow of liquid causing the spread of liquid through a large volume of the cartridge. In still another aspect, the beverage dispensing machine is designed to inhibit contamination of the extraction and delivery systems and thereby inhibit flavor from one beverage product used during a cycle of the machine, being imparted to beverages brewed during following cycles of the machine.

BRIEF DESCRIPTION OF THE DRAWINGS

The invention will be better understood with reference to the drawings and to the following description, in which.

DETAILED DESCRIPTION OF THE PREFERRED EMBODIMENTS

Figure 1:
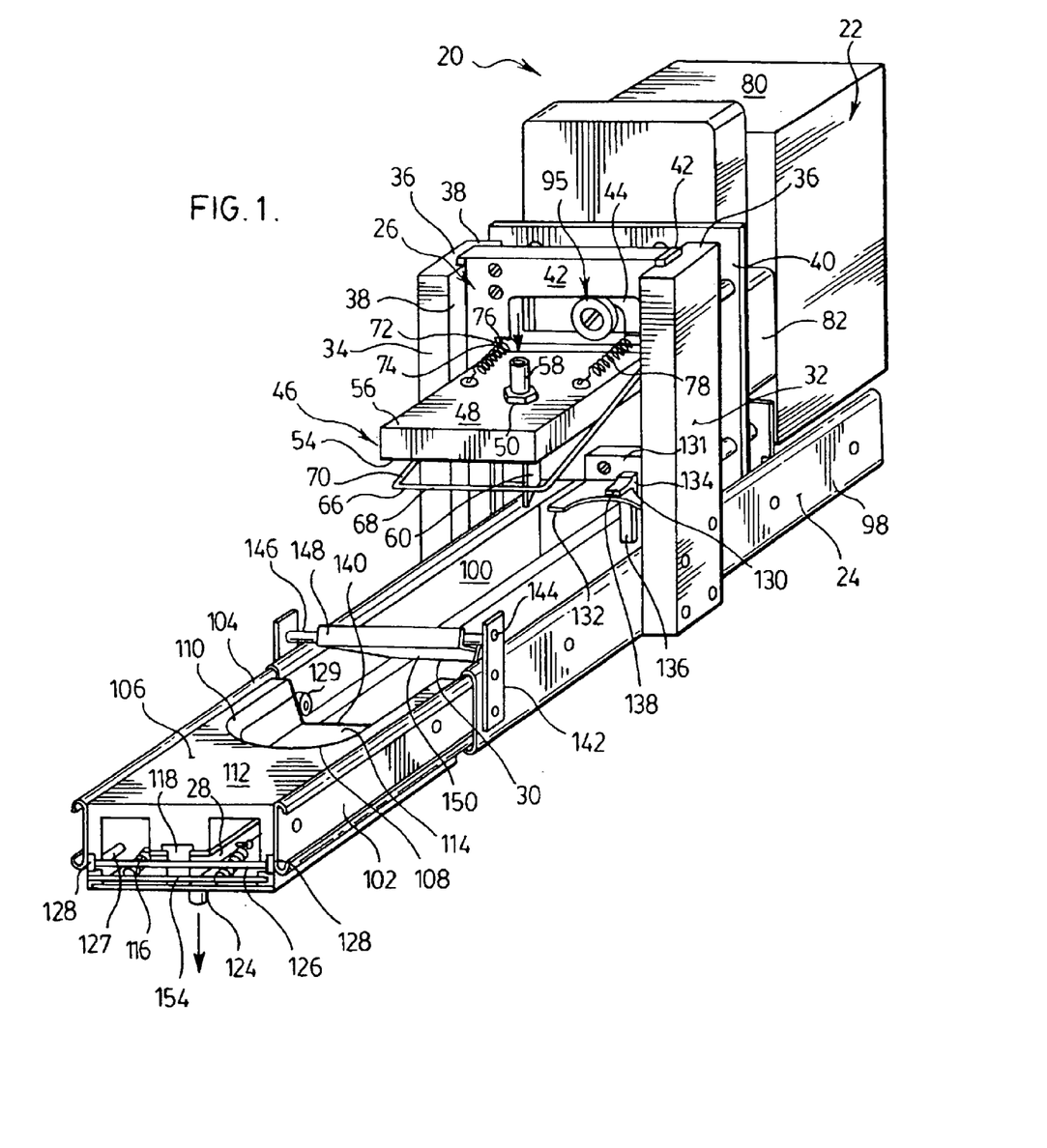
FIG. 1 is an isometric view of a beverage dispensing machine having a cartridge ejector mechanism, in accordance with an embodiment of the present invention.

Referring first to FIG. 1, a beverage dispensing machine is indicated generally by the numeral 20. The beverage dispensing machine 20 generally includes a driving assembly 22 that is mounted in a housing (not shown). A slide assembly 24 is slidable into and out of the housing and moves a beverage cartridge 200 from a loading position shown in FIG. 3 to a loaded position shown in FIG. 4. The driving assembly 22 is mechanically coupled to an injection assembly 26 that is movable into and out of an injection position, shown in FIGS. 4 and 5. In the injection position, the injection assembly 26 interacts with the cartridge 200 to inject water into the cartridge 200 and an extraction mechanism 28 interacts with the cartridge to receive brewed beverage. A cartridge ejector mechanism 30 is also provided to remove the used beverage cartridge 200 from the slide assembly 24.

Figure 2:
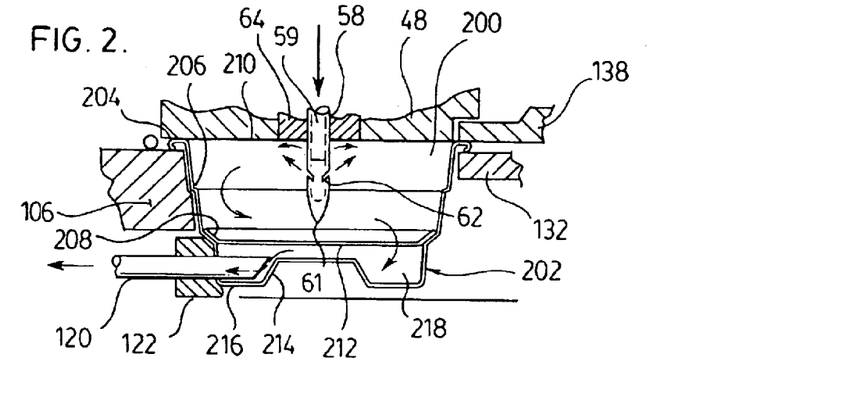
FIG. 2 is a partial sectional side elevational view of a portion of the beverage dispensing machine of FIG. 1, including a beverage cartridge.

Reference is made to FIG. 2 to describe the typical beverage cartridge 200 used with the beverage dispensing machine 20 of the present invention. Typically, the beverage cartridge 200 has a stepped conical shape with a stepped sidewall 202 such that the diameter of the cartridge 200 decreases in size toward the lower end of the cartridge 200. The cartridge 200 has an upper lip 204, an upper step 206 and an angled lower step 208. A cover 210 is connected to the upper lip 204 and hermetically seals the cartridge 200 for storage purposes. A filter 212 is located at the lower step 208 and a powdered beverage is contained within the cartridge 200 between the filter 212 and the cover 210. A recess 214 is formed in the bottom wall 216 of the cartridge 200 to provide a support for the filter 212 in the event that the filter 212 sags downwardly. It will be understood that a cavity 218 is disposed between the filter 212 and the bottom wall 216 of the cartridge 200 for receiving the brewed beverage.

Referring again to the beverage dispensing machine 20, the injection assembly 26 will now be described in more detail. The injection assembly 26 includes a pair of vertical guides 32 and 34 that are C-shaped channels. Each of the channels 32, 34 have central portions 36 with flanges 38 extending therefrom. A back plate 40 is fixed to and spaced from the guides 32, 34, as shown. Clearly the back plate 40 supports the driving assembly 22.

The injection assembly 26 also includes a sliding plate 42 that slides vertically within the channels provided by guides 32 and 34. The plate 42 has a horizontally extending slot 44 therein that interacts with the driving assembly 22, as will be further described. A cartridge piercing assembly 46 extends from the sliding plate 42, as best illustrated in FIGS. 2 to 5.

Figure 3:
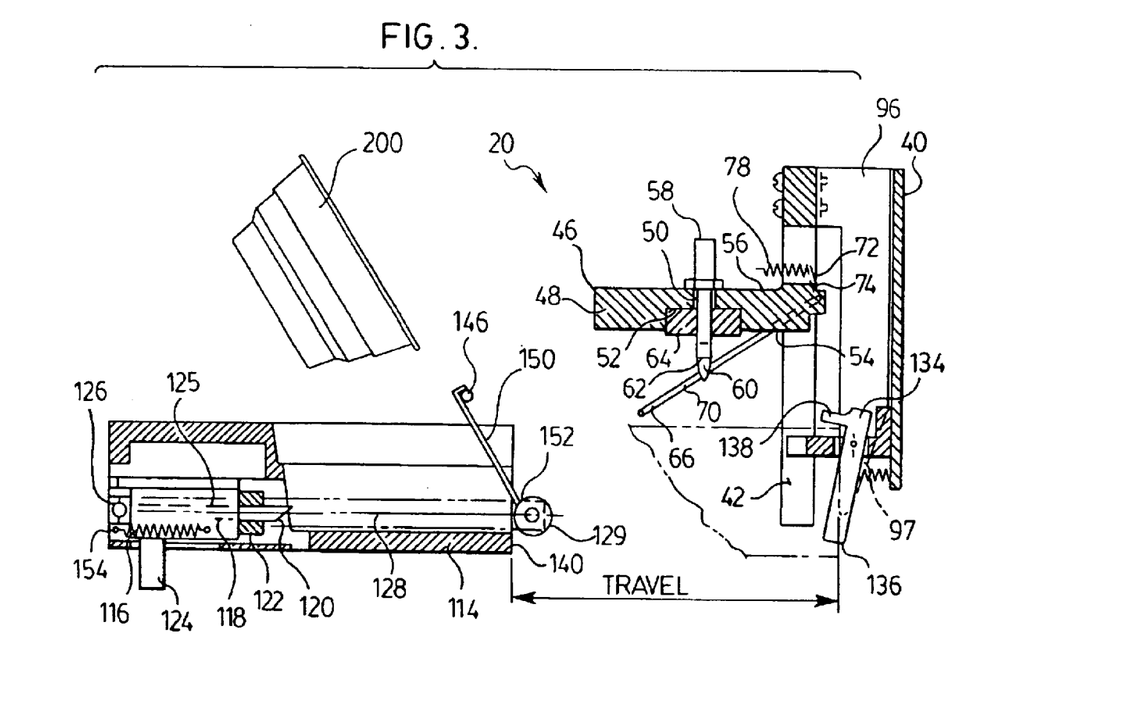
FIG. 3 is a partial sectional side elevational of the beverage dispensing machine of FIG. 1, in a loading position.

Reference is now made to FIG. 3, cartridge piercing assembly 46 includes a plate 48 that extends generally perpendicularly from the sliding plate 42 between the guides 32, 34. A bore 50 is provided approximately through the center of the plate 48, and includes a shoulder 52 between a small diameter portion of the bore 50 and a large diameter portion of the bore 50. As shown, the large diameter portion of the bore 50 is proximal to and extends through a bottom side 54 of the plate 48. Conversely, the small diameter portion of the bore 50 is proximal to and extends through a top side 56 of the plate 48. An injector 58 (best shown in FIG. 2) extends through the bore 50 such that a tip 60 of the injector 58 protrudes from the bottom side 54 of the plate 48. The injector 58 is a tube with a passage 59 for fluid flow therein. The tip 60 of injector 58 is provided with outlets 62 in the form of angled slots cut into the side of the injector 58. Clearly, the angled slots are in fluid communication with the passage 59 in the injector and the end 61 of the tip 60 of the injector is closed. Thus, water travelling down the injector 58 is forced out through the angled slots. As a result of the outlets 62 being in the form of angled slots, the liquid that is injected through the injector, is expelled in an upward spray. When the injector 58 is inserted into the cartridge 200, water is sprayed upwardly in the cartridge 200 and is deflected off the inside surface of the cover 210 and is sprayed over a large volume of powdered beverage. The provision and control of water will be further described herein below.

A water inlet sealing member 64 is disposed in the larger diameter portion of the bore 50, around the injector 58 such that the tip 60 of the injector 58 extends from the water inlet sealing member 64. The sealing member 64 protrudes slightly from the large diameter portion of the bore 50 for sealing engagement with the beverage filter cartridge 200, when the injector 58 pierces the cartridge 200 during use of the beverage dispensing machine 20.

Figure 5:
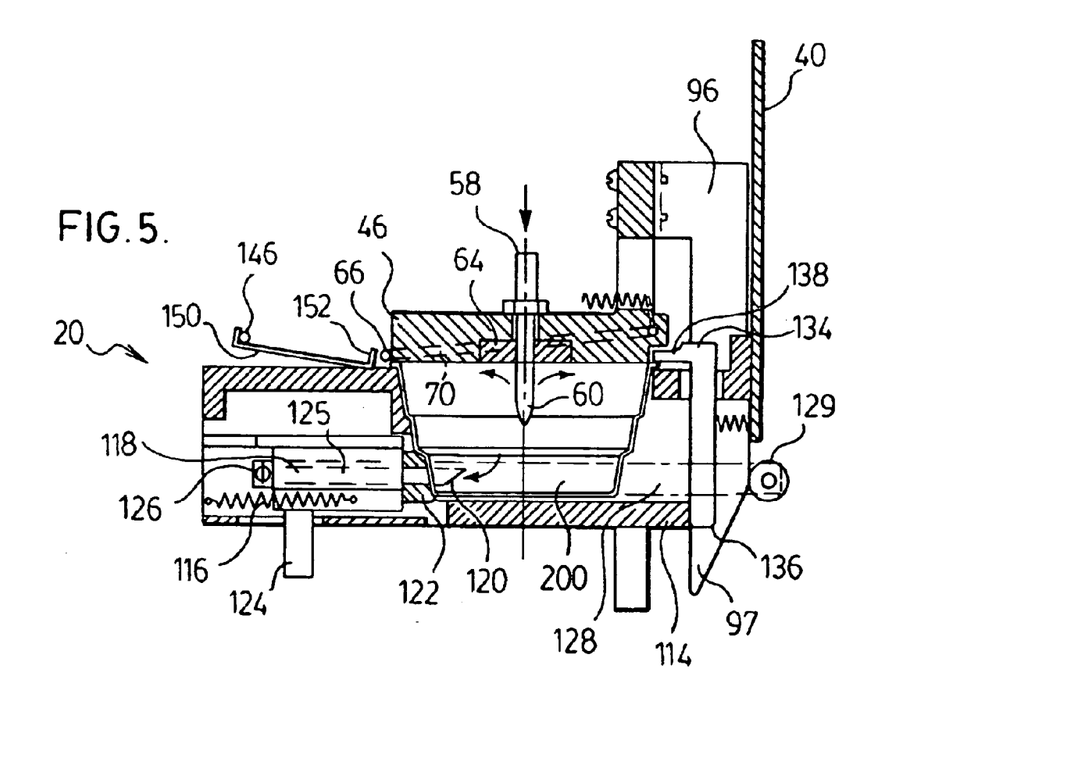
FIG. 5 is a partial sectional side elevation view of the beverage dispensing machine of FIG. 1, in a dispensing position.

A retaining member 66 made of a thin rod formed generally in a C-shape, is hingedly connected to sides of the plate 48. The retaining member 66 includes a central portion 68 that is slightly wider than the plate 48 and generally parallel sides 70 that extend from the central portion 68 and are hingedly connected to sides of the plate 48. Each side 70 has an end 72 extending therefrom. The ends 72 include respective first portions 74 that extend approximately perpendicularly away from the sides 70 and generally parallel to each other, and respective second portions 76 (shown in FIG. 1) that extend inwardly toward each other. The second end portions 76 are connected to coil springs 78 that in turn are connected to the top side 56 of the plate 48, thereby spring biasing the retaining member 66 in a downward direction as shown in FIGS. 1 and 3. The retaining member 66 hinges about the connection points to the plate 48 and is urged into a generally horizontal position, as shown in FIG. 5, when the injection assembly 26 is moved to the injection position. The retaining member 66 aids in maintaining the beverage cartridge 200 in position when the cartridge 200 is loaded and the slide assembly 24 is in the loaded position.

The injection assembly 26 is vertically driven into and out of the beverage dispensing position by the driving assembly 22. The driving assembly 22 includes a motor 80 that is supported at the rear of the housing. In the preferred embodiment, the motor 80 is a fractional horse power motor, however, any suitable driving motor may be used. The drive shaft (not shown) of the motor 80 drives a reduction gear 82. A rotor 84 extends from the reduction gear 82, through a hole in the back plate 40, and is drivingly connected to a cam 86 through a first aperture 88 in the cam 86. In the present embodiment, the rotor 84 is fixed in the first aperture 88 in the cam 86 by a set screw 90. The cam 86 has a second aperture 92 that is offset from the driving axis of the rotor 84. A shaft 94 having a roller bearing 95 mounted thereon extends from the second aperture 92.

The roller bearing 95 extends through the slot 44 in the sliding plate 42 so that the driving assembly 22 is in driving engagement with the injection assembly 26, causing the injection assembly 26 to rise and fall.

Figure 4:
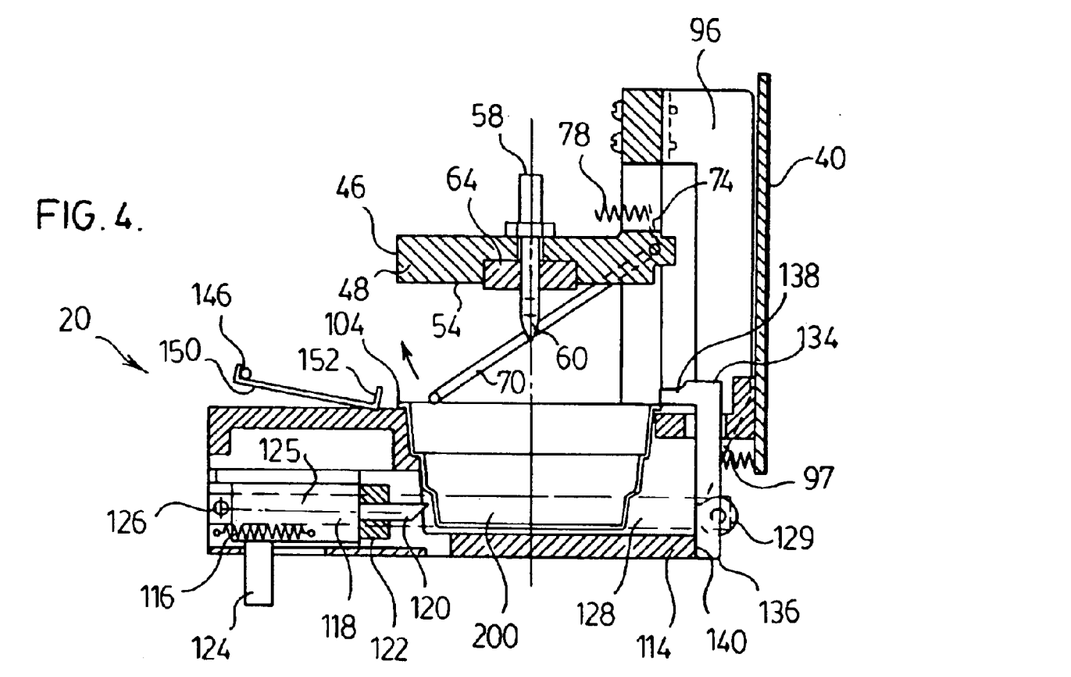
FIG. 4 is a partial sectional side elevational view of the beverage dispensing machine of FIG. 1 in a loaded position.

As previously indicated, the slide assembly 24 is mounted in the housing and is slidable between the loading position of FIG. 3 and the loaded position of FIG. 4. The slide assembly 24 includes a pair of horizontal tracks 98 and 100 (best shown in FIG. 1) that are fastened to the guides 32 and 34. The horizontal tracks 98, 100 extend rearwardly and forwardly of the injection assembly 26 and are fixed to the housing (not shown) of the beverage dispensing machine.

An actuating member 96 is fastened to the rear of the sliding plate 42 and extends downwardly, behind the sliding plate 42. As shown in FIGS. 3 to 5, the actuating member 96 includes a wedge-shaped end 97 for actuating the extraction mechanism 28, as will described further below. Clearly, the actuating member 96 moves vertically up and down with the sliding plate 42.

Rails 102, 104 are received by the tracks 98, 100, respectively, and slide therein between the loading position of FIG. 3 and the loaded position of FIG. 4. Roller bearings in the tracks 98, 100 aid in sliding the rails 102, 104 along their respective tracks 98, 100. A cartridge holder 106 is located at the forward end of the rails 102 and 104 and extends therebetween. The cartridge holder 106 has an arch-shaped cavity 108 with a stepped sidewall 110 for receiving the beverage cartridge 200 therein. The arch-shaped cavity 108 is sized and shaped to receive the beverage cartridge 200 such that the upper lip 204 of the beverage cartridge 200 is supported by an upper surface 112 of the cartridge holder 106. Clearly, the stepped sidewall 110 corresponds with the upper step 206 of the beverage cartridge 200 described above. The cartridge holder 106 also includes a bottom plate 114 which extends beneath the cavity 108 and under the cartridge 200, when the beverage cartridge 200 is received in the cavity 108.

The extraction mechanism 28 is disposed in a portion of the cartridge holder 106 and is slideable between a non-use position, shown in FIG. 4, and the extraction position, shown in FIG. 5. The extraction mechanism 28 is biased in the non-use position by coil springs 116 and is urged into the extraction position to extract brewed beverage from the cartridge 200. The extraction mechanism 28 includes a beverage outlet member 118 that slides within the cartridge holder 106 and is connected to one end of each of the springs 116. The opposing ends of the springs 116 are connected to a rod 154 that is fixed at the forward end of the cartridge holder 106. An extractor 120 is connected to the beverage outlet member 118 and extends therefrom, toward the cavity 108. Clearly, the extractor 120 extends through an opening in the sidewall 110 and into the cavity 108 when the extraction mechanism 28 is in the extraction position. A sealing gasket 122 surrounds the extractor 120 and abuts the beverage outlet member 118 to abut with and form a seal around the sidewall 202 of the cartridge 200, when the beverage dispensing machine 20 is in use and the extractor 120 pierces the sidewall 202 of the cartridge 200. A beverage outlet tube 124 is connected to the beverage outlet member 118. The beverage outlet member 118 includes a passage 125 therein for providing a fluid flow path from the extractor 120 to the beverage outlet tube 124.

To urge the extraction mechanism 28 into the extraction position, a push rod 126 is located adjacent an end of the beverage outlet member 118, on the opposite side of the beverage outlet member 118 as the extractor 120, as best shown in FIG. 1. The push rod 126 is slideable in a pair of recessed tracks 127 in the cartridge holder 106. Linkage arms 128 (best shown in ghost outline in FIGS. 3 to 5) are fixed to end portions of the push rod 126 and extend horizontally past the bottom plate 114. The linkage arms 128 are generally parallel to each other and extend on either side of the arch-shaped cavity 108 so as not to interfere with the cavity. Rearward ends of the linkage arms 128 are fixed to sides of roller wheels 129. Since the linkage arms 128 are fixed to sides of the roller wheels 129, a space is defined at a forward end of the each of the roller wheels 129, adjacent rearward portions of the linkage arms 128. The space is sized and shaped for receiving the actuating member 96.

It will be understood that when the slide assembly 24 is in the loaded position, the space at the forward end of each of the roller wheels 129 is aligned with the wedge shaped end 97 of the actuating member 96. As the driving assembly 22 causes the sliding plate 42 to lower, the actuating members 96 lower such that the wedge shaped end 97 of each of the actuating members 96 abuts the respective roller wheel 129. Thus, the roller wheels 129 are drawn rearwardly as they roll along the wedge shaped end 97 of the actuating member 96 that is being driven downwardly. As the roller wheels 129 are drawn rearwardly, the linkage arms 128 are also drawn rearwardly, causing the push rod 126 to slide in the recessed tracks 127. As the push rod 126 slides in the recessed tracks 127, the push rod 126 abuts the beverage outlet member 118, pushing the beverage outlet member 118 toward the cavity 108 causing the springs 116 between the rod 154 and the beverage outlet member 118, to extend. Thus, the extractor 120 is moved such that it extends through the opening in the sidewall 110 and into the cartridge 200.

As stated, the extraction mechanism 28 is biased in the non-use position. When the driving assembly 22 causes the sliding plate 42 to rise, the actuating members 96 rise such that the wedge shaped end 97 of each of the actuating members 96 are lifted out of contact with the roller wheels 129. The coil springs 116 bias the beverage outlet member 118 to return to the forward position such that the extractor 120 is withdrawn from the opening in the sidewall 110. As the beverage outlet member 118 returns to the forward position, the push rod 126, the linkage arms 128 and the roller wheels 129 return to their forward positions. Thus, the springs 116 bias the extraction mechanism 28 in the non-use position when the actuating members 96 are out of contact with the roller wheels 129.

A cartridge support 130 extends generally perpendicularly from the back plate 40 and is fixed thereto by fastening a flange portion 131 of the cartridge support 130 to the back plate 40. The cartridge support 130 includes a section 132 with a semicircular cut-out for engaging with and supporting the upper lip 204 of the beverage cartridge 200. The cartridge support 130 is sized and shaped to support a portion of the upper lip 204 of the beverage cartridge 200, when the slide assembly 24 is in the loaded position.

A latch 134 extends through an opening in the cartridge support 130 and is hinged to the cartridge support 130 at the opening therein, for engaging an upper surface of the upper lip 204 of the beverage cartridge 200. The latch 134 includes an engagement arm 136 that extends through the opening in the cartridge support 130 and a catch 138 for engaging the upper lip 204 of the beverage cartridge 200. The latch 134 is spring biased in an open position, as shown in FIG. 2 and is urged to the closed position shown in FIG. 3 when the slide assembly 24 is moved from the loading position to the loaded position. This is accomplished as an end portion 140 of the bottom plate 114 of the cartridge holder 106 abuts the engagement arm 136 of the latch 134 and pushes the engagement arm 136 into a generally vertical position, as shown in FIG. 3. Thus, the catch 138 is urged forward thereby engaging the upper lip 204 of the cartridge 200.

The cartridge ejector mechanism 30 is mounted to the tracks 98, 100 at a forward end thereof and is laterally spaced from the guides 32, 34. The cartridge ejector mechanism 30 includes a pair of support brackets 142 each fastened to and extending generally perpendicularly from the respective tracks 98, 100. Each of the support brackets 142 has a hole 144 extending through an upper portion thereof, spaced from the respective track 98, 100. A pivot rod 146 extends between the support brackets 142 and is received at each end in the holes 144. An ejector 148 is fixed to the pivot rod 146 and a main body 150 of the ejector 148 extends outwardly and generally in the rearward direction therefrom, to a lip 152. The ejector 148 is biased downwardly by the weight of the main body 150, which is off center with respect to the pivot rod 146, into the position shown in FIGS. 1 and 3. When the slide assembly 24 is moved from the loading position to the loaded position, the ejector 148 is urged into the position shown in FIG. 4, as the ejector 148 passes over the loaded cartridge 200. Thus, the ejector 148 abuts the upper surface 112 of the cartridge holder 106, along the line where the main body 150 meets the lip 152. A stop (not shown) is provided to inhibit the ejector 148 from rotating about the pivot rod 146 such that the main body 150 extends in the forward direction.

It will be understood that the beverage dispensing machine 20 described herein above is intended for brewing beverages, such as coffee. It will thus be apparent that a heated water source and control is employed in the beverage dispensing machine 20 of the present invention. There are many different possible arrangements for providing and controlling a water source. Preferably, the heated water source control is operable to adjust the heat temperature of the water, and the flow rate of the water for adjusting the brew cycle time and temperature.

Figure 8:
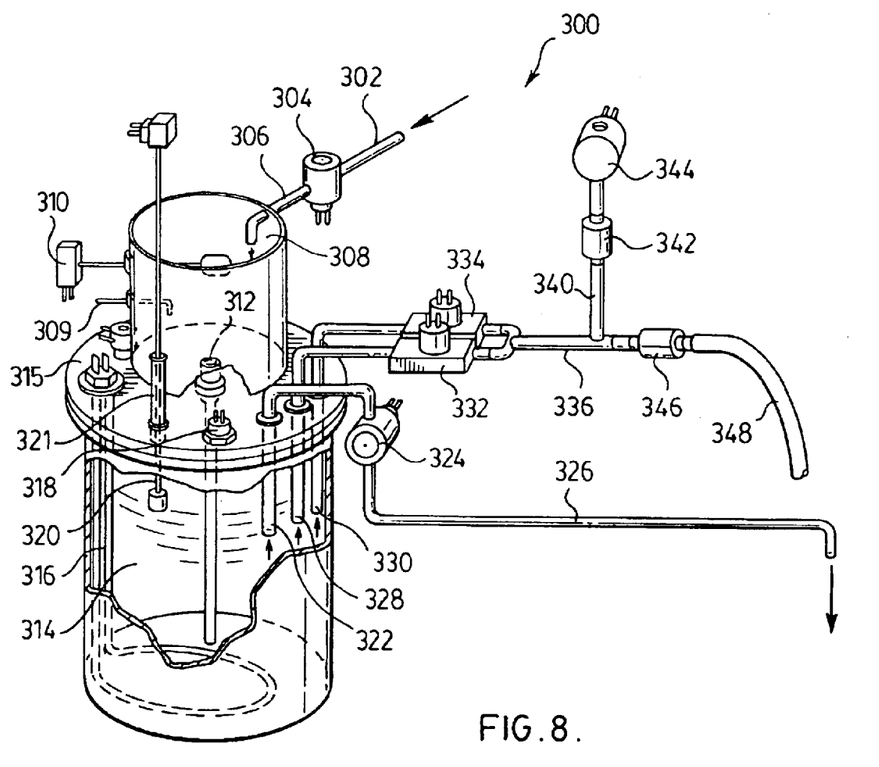
FIG. 8 is an isometric view, partially in section, of a water supply for the beverage dispensing machine of FIG. 1, according to an embodiment of the present invention.

In one particular embodiment, a heated water supply 300 is used, as shown in FIG. 8. The water supply 300 includes an inlet tube 302 that receives water from a water source. The inlet tube 302 is connected to a water inlet solenoid valve 304 for control of the water. The solenoid valve 304 is connected to a reservoir inlet tube 306 for providing water to a reservoir 308. A water level sensor 309 is disposed in the reservoir 308 for monitoring the water level therein and a valve shut off control 310 is provided in the reservoir 308 as a back up system for inhibiting overflow of water in the event that the water inlet solenoid valve 304 fails. A coupling 312 connects the reservoir 308 to a tank 314 and provides a fluid flow path from the reservoir 308 to the tank 314. The tank 314 includes a heating element 316 extending through the top 315 of the tank 314 for heating the water to a desired temperature. A temperature sensor 318 also extends through the top 315 of the tank 314 to a suitable level for contact with the water therein for monitoring the temperature of the water. A water level sensor 320 extends through a tube 321 in the top 315 of the tank 314 for monitoring the water level therein. The tube 321 serves as a vent to allow air to escape the tank 314 to inhibit back pressure from building up.

A first water suction tube 322 extends through the top 315 and into the tank 314 for receiving water from the tank 314. The first suction tube 322 is connected through a hot water solenoid valve 324 outside the tank for controlling flow of hot water from the tank 314, to a hot water outlet tube 326.

Second and third water suction tubes 328, 330, respectively, extend through the top 315 and into the tank 314 for receiving water from the tank 314. The second and third suction tubes 328, 330 are connected through solenoid pumps 332, 334, respectively, to a joining tube 336 that joins the flow from the second and third suction tubes 328, 330, respectively. An air inlet tube 340 also feeds into the joining tube 336. The air inlet tube 340 is connected to a back flow inhibitor valve 342 and to an air pump 344 for feeding air to the joining tube 336. The joining tube 336 is connected through an adjustable flow restrictor 346 and to an outflow tube 348 for providing controlled heated water to the injector 58. It will be understood that the solenoid valves 304, 324, solenoid pumps 332, 334, water level sensors 309, 320, temperature sensor 318, heating element 316, air pump 344 and the adjustable flow restrictor 346 are all connected to a control unit (not shown) for controlling the temperature of the tank 314, and the water flow out of the outflow tube 348 and the hot water outlet tube 326. Thus, the water supply is operable to adjust the heat temperature of the water, and the flow rate of the water for adjusting the brew cycle time and temperature.

During the brew cycle, water enters through the inlet tube 302. The water flow through the inlet tube 302 is controlled by the controller that allows water in based on the level of water sensed by the water level sensor 309 and controls the water inlet solenoid valve 304 to allow or inhibit water flow into the reservoir 308. In the event that the water inlet solenoid valve 304 and water level sensor 309 fail, the water valve shut off control 310 rises and shuts the water off.

The water enters the tank 314 from the reservoir 308 through the coupling 312 and is heated by the heating element 316. Pressure in the reservoir 308 causes the water to flow through the second water suction tube 328 and the third water suction tube 330. The solenoid pumps 332, 334 are engaged during the brew cycle to draw water from the tank 314 through the suction tubes 328, 330. Water flows from the solenoid pumps 332, 334 to the adjustable flow restrictor 346 which restricts the flow of water depending on the orifice in the adjustable flow restrictor 346. Thus, the adjustable flow restrictor 346 controls and establishes the time for passage of a given quantity of water out of the outflow tube 348. When the level of water in the tank 314 drops to a predetermined point, the solenoid pumps 332, 334 are disengaged and air is forced from the air pump 344, through the adjustable flow restrictor and out the outflow tube, thereby purging the outflow tube 348 of water. This also purges the injector 58, the extractor 120, the beverage outlet member 118 and the beverage outlet tube 124 of liquid. It will be appreciated that the back flow inhibitor valve 342 inhibits water from flowing backward to the air pump 344.

The control unit controls each of the functions and inhibits water from entering the reservoir inlet tube 306 during the brew cycle. Water is inhibited from entering the inlet tube 306 for a few seconds after the outflow tube 348 has been purged.

The hot water solenoid valve 324 is controlled via the control unit (not shown) and a push button switch that allows manual pushing of the button for engaging the hot water solenoid valve 324. This allows water to flow from the first water suction tube 322, through the hot water solenoid valve 324 and out the hot water outlet tube 326 for receipt of hot water rather than brewed beverage. If the push button is not pressed, water is inhibited from flowing through the hot water solenoid valve 324. When the hot water solenoid valve 324 is engaged, the water level drops in the reservoir 308 and the tank 314 and the solenoid pumps 332, 334 are turned off until the water level sensors 309, 320 again sense water at a sufficient level.

The water level sensor 320 is connected to the control unit for controlling the liquid that passes through the second and third water suction tubes 328, 330 by controlling the solenoid pumps 332, 334. When the water level sensor 320 is in a high position thus measuring a high water level, the solenoid pumps 332, 334 are engagable until the water level sensor 320 is in a low position, thus measuring a low water level. When a low water level is measured, the solenoid pumps 332, 334 are shut off and the air pump 344 is engaged. Thus, the volume of water delivered from the tank 314 is controlled. During the period that the solenoid pumps 332, 334 are engaged, the water inlet solenoid valve 304 and the hot water solenoid valve 324 are not engagable during the period of time that the solenoid pumps 332, 334 are engaged.

Clearly the water supply 300 permits control of the temperature of the water, and the flow rate of the water for adjusting the brew cycle time and temperature. Further, hot water can be obtained from the hot water outlet tube 326. Also, purging of the outflow tube 348 inhibits contamination of the extraction and delivery systems and thereby inhibits flavor from one beverage product used during a cycle of the machine, being imparted to beverages brewed during following cycles of the machine.

Operation of the beverage dispensing machine will now described using coffee as an exemplary beverage. Referring now to FIG. 3, the slide assembly 24 starts in the loading position. A user deposits a beverage cartridge 200 in the cavity 108 of the cartridge holder 106 and pushes the slide assembly 24 into the loaded position as shown in FIG. 4. As the slide assembly 24 moves towards the loaded position, the cartridge 200 articulates with the main body 150 of the ejector 148 causing the ejector 148 to pivot about the pivot rod 146. The ejector is thereby pivoted to the position shown in FIG. 4 such that the ejector 148 abuts the upper surface 112 of the cartridge holder 106.

As the slide assembly 24 moves into the loaded position, the retaining member 66 slides over the cover 210 of the cartridge 200. Clearly the cartridge 200 is moved toward the cartridge support 130 such that a portion of the lip 204 of the cartridge 200 rests on the section 132 of the cartridge support 130, with the semi-circular cut out. Thus, a portion of the lip 204 of the cartridge 200 is rests on the section 132 with the semi-circular cut out and another portion of the lip 204 rests on the upper surface 112 of the cartridge holder 106. Concurrently, the end portion 140 of the bottom plate 114 of the cartridge holder abuts the engagement arm 136 of the latch 134 and urges the latch 134 into the position shown in FIG. 4, in which the catch 138 engages the lip 204 of the cartridge 200. Thus, the cartridge 200 is supported and retained in the cartridge holder 106.

Once the slide assembly 24 is in the loaded position shown in FIG. 4, the beverage preparation cycle begins. The user typically presses a button to start the cycle however this may be accomplished in any suitable manner. Preferably, a limit switch (not shown) is located adjacent the section 132 and is engaged in order to start the beverage preparation cycle. This switch inhibits the beverage brewing cycle from beginning when a cartridge 200 is not loaded into the cartridge holder 106.

Figure 7:
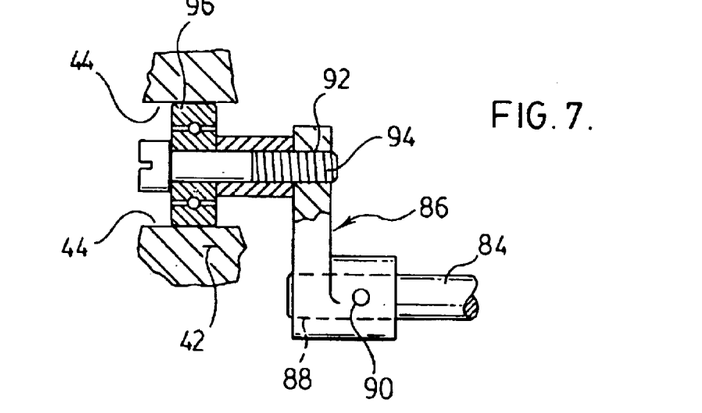
FIG. 7 is a partial sectional side elevation view of a portion of the beverage dispensing machine of FIG. 1, drawn to a larger scale.

In the loaded position of FIG. 4, the cam 86 is oriented with the second aperture 92 above the first aperture 88 (as best shown in FIG. 7). The motor 80 drives the rotor 84, which causes the cam 86 to rotate. Rotation of the cam 86 causes the roller bearing 95 to move downwardly, rotating about the shaft 94, which in turn drives the sliding plate 42 and the cartridge piercing assembly 46 downwardly into the dispensing position shown in FIG. 5. Thus, the tip 60 of the injector 58 pierces the cover 210 of the cartridge and the water sealing member 64 applies a force to the cartridge 200.

It will be understood that the extraction mechanism 28 also moves into the extraction position as the sliding plate 42 is driven downwardly causing the actuating members 96 to move downwardly. As described above, the extractor 120 is moved such that it extends through the opening in the sidewall 110 and pierces the cartridge 200. Clearly, the extraction mechanism 28 moves approximately parallel with the bottom plate 114 of the holder 106, towards the axial center of the cartridge 200 such that the extractor 120 pierces the lower portion of the sidewall 202 of the cartridge 200 and enters the cavity 218. It can be seen that the direction of movement of the extraction mechanism 28 is approximately orthogonal to the direction of movement of the injector 58 of the cartridge piercing assembly 46.

In the dispensing position, the beverage cartridge 200 is supported and retained in the cartridge holder 106. After the injector 58 pierces the cartridge 200 and a predetermined amount of hot water, from the water supply 300, is forced through the outflow tube 348 and the injector 58 and into the cartridge 200. Thus, water travels through the passage 59 of the injector and the outlets 62 of the injector 58 diffuse water in a dispersed spray in the upward direction, into the cartridge 200. The diffused water is then deflected downwardly by the cover 210 of the cartridge 200, mixing with powdered beverage, such as coffee grinds, held in the cartridge 200. Brewed coffee then flows downwardly through the filter 212 and collects in the cavity 218 of the cartridge 200, between the filter 212 and the bottom wall 216. From the bottom cavity 218, the coffee is removed through the extractor 120 and flows out through the beverage outlet member 118 and out of the beverage outlet tube 124 into a container such as a coffee mug. To ensure that the coffee flows out of the cartridge 200 efficiently after injection of the water, air from the air pump 344 is forced through the injector 58. As previously described, this purges the outflow tube 348 of water and to purge the injector 58, the extractor 120, the beverage outlet member 118 and the beverage outlet tube 124 of liquid.

Following preparation of the beverage, water and air flow from the water supply 300 is stopped and the motor 80 resumes driving the rotor 84. The cam 86 rotates from the dispensing position of FIG. 5 in which the second aperture 92 is located below the first aperture 88 (best shown in FIG. 7) to the post-dispensing position. The post-dispensing position is similar to the position of FIG. 4 in which the second aperture 92 is located above the first aperture 88. The extraction mechanism 28 is also retracted to the position shown in FIG. 3. The cycle is now complete. In order to brew a second beverage, the slide assembly 24 is pulled outwardly for loading an unused cartridge 200 into the cartridge holder 106.

Figure 6:
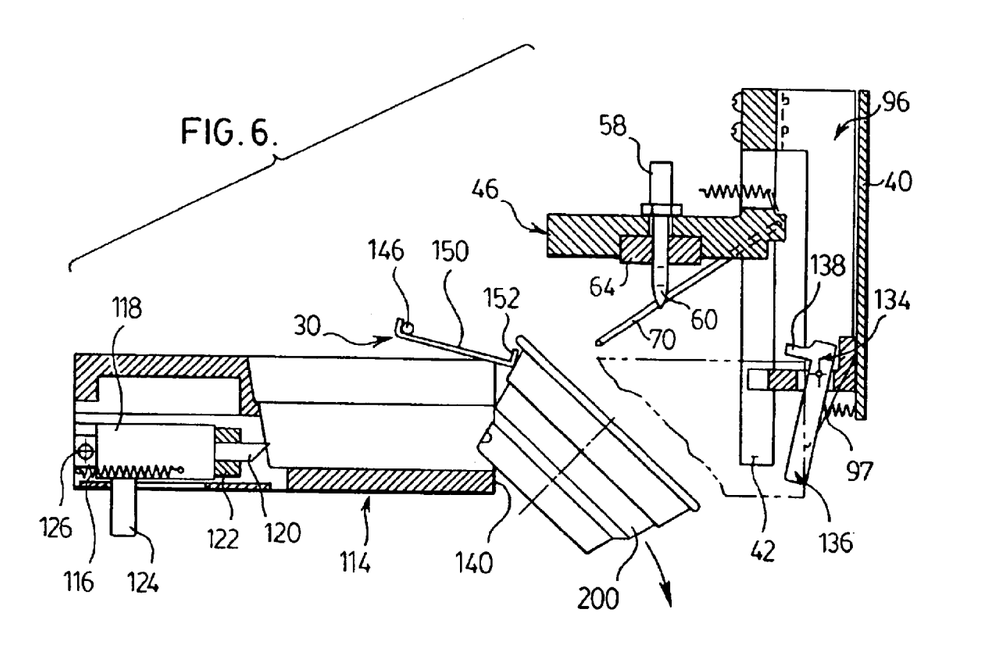
FIG. 6 is a partial sectional side elevation view of the beverage dispensing machine of FIG. 1, in a cartridge-ejection position.

Reference is now made to FIG. 6 to describe the ejection of the used cartridge 200. As the slide assembly 24 moves outwardly, the cartridge holder 106 moves away from the cartridge support 130 and the ejector 148 abuts an edge of the lip 204 of the cartridge 200. As the cartridge holder 106 moves farther away from the cartridge support 130, the cartridge 200 is inhibited from sliding with the cartridge holder 106 by the ejector 148. When the cartridge holder 106 is moved far enough away from the cartridge support 130, the cartridge 200 is no longer supported by the cartridge holder 106 and falls off the end portion 140 of the bottom plate 114 of the cartridge holder 106. Thus, the cartridge 200 is falls between the tracks 98, 100 into the lower part of the housing where used cartridges 200 are collected.

It will be understood that when the sliding plate 42 moves vertically downwardly, the actuating members 96 interact with the roller wheels 129 which are connected to the linkage arms 128 that are in turn connected to the push rod 126 in the recessed tracks 127 of the cartridge holder 106. Clearly, the actuating members 96 lock the slide assembly 24 in the loaded position thereby inhibiting the user from interrupting the brew cycle by pulling the slide assembly 24 outwardly. Alternate locking means may also be used to inhibit a user from interrupting the brew cycle. Such locking means include, for example, a limit switch located on one of the tracks 98, 100 so that the end portion 140 of the cartridge holder 106 engages the switch in order for the beverage dispensing machine 20 to begin the brewing cycle.

Although operation of the beverage dispensing machine 20 has been described in relation to coffee, it will be appreciated by those of skill in the art that any type of beverage could be produced.

If desired, a needle may be provided on the cartridge piercing assembly that extends from the plate 48 so that the needle extends lower than the injector 58. This embodiment is useful when there is a positive pressure in the cartridges 200 that can occur at increased elevations. When the cartridge piercing assembly 46 is lowered into the dispensing position of FIG. 5, the needle pierces the cartridge 200 first. This allows the cartridge 200 to be vented prior to the injector engaging the cartridge 200 so that the injector 58 does not become contaminated by the powdered beverage.

Although a preferred embodiment of the present invention has been described, those of skill in the art will appreciate that variations and modifications may be made without departing from the spirit and scope thereof as defined by the appended claims.

What is claimed is:

1. A beverage dispensing apparatus for extracting beverage from a cartridge, the beverage dispensing apparatus comprising:
   a slide assembly including a cartridge holder for receiving the cartridge, the slide assembly for moving the cartridge holder from a loading position to a loaded position;
   an injection assembly coupled to the slide assembly, the injection assembly including an injector movable relative to the slide assembly, into and out of an injection position, for piercing the cartridge to inject a liquid into the cartridge;
   a driving assembly coupled to the injection assembly for moving the injection assembly into and out of the injection position;
   an extraction mechanism cooperating with the cartridge holder and including an extractor movable between an extraction position and a non-use position, the extraction position for piercing the cartridge and extracting the beverage,
   wherein when said injector moves into said injection position, said injector is located to pierce a top cover of the cartridge and when said extractor moves to said extraction position, said extractor is located for piercing the cartridge on a side wall thereof, between a filter and a bottom wall of the cartridge.

2. The beverage dispensing apparatus according to claim 1, wherein the direction of movement of the slide assembly is substantially orthogonal to the direction of movement of the injection assembly.

3. The beverage dispensing apparatus according to claim 1, wherein the direction of movement of said extractor is substantially orthogonal to the direction of movement of said injector.

4. A beverage dispensing apparatus for extracting beverage from a cartridge, the beverage dispensing apparatus comprising:
   a slide assembly including a cartridge holder for receiving the cartridge, the slide assembly for moving the cartridge holder from a loading position to a loaded position, the cartridge holder including an arch-shaped cavity for receiving the cartridge therein;
   an injection assembly coupled to the slide assembly, the injection assembly including an injector movable relative to the slide assembly, into and out of an injection position, for piercing the cartridge to inject a liquid into the cartridge;
   a driving assembly coupled to the injection assembly for moving the injection assembly into and out of the injection position;
   an extraction mechanism cooperating with the cartridge holder and including an extractor movable between an extraction position and a non-use position, the extraction position for piercing the cartridge and extracting the beverage; and
   a cartridge ejector mechanism, including an ejector biased downwardly for contacting said cartridge when said slide assembly is moved from said loaded position to said loading position.

5. The beverage dispensing apparatus according to claim 4, wherein said ejector is biased downwardly into contact with a surface of the cartridge holder for contacting a lip of said cartridge when said slide assembly is moved from said loaded position to said loading position, said ejector for inhibiting said cartridge from moving when said slide assembly moves from said loaded position into said loading position.

6. The beverage dispensing apparatus according to claim 4, further comprising a cartridge support with a semicircular cut-out portion for cooperating with the cartridge holder for supporting the cartridge.

7. The beverage dispensing apparatus according to claim 6, wherein said cartridge holder is adjacent said cartridge support when said cartridge holder is in said loaded position and said cartridge holder is spaced from said cartridge support when said cartridge holder is in said loaded position.

8. The beverage dispensing apparatus according to claim 7, wherein said arch-shaped cavity of said cartridge holder and said semi-circular cut-out portion of said cartridge support form a generally circular support when said cartridge holder is in said loaded position, for holding the cartridge therein.

9. The beverage dispensing apparatus according to claim 5, wherein said ejector displaces the cartridge from the cavity when the slide assembly moves from the loaded position to the loading position.

10. A beverage dispensing apparatus for extracting beverage from a cartridge, the beverage dispensing apparatus comprising:
    a slide assembly including a cartridge holder for receiving the cartridge, the slide assembly for moving the cartridge holder from a loading position to a loaded position;
    an injection assembly coupled to the slide assembly, the injection assembly including an injector movable relative to the slide assembly, into and out of an injection position, for piercing the cartridge to inject a liquid into the cartridge;
    a driving assembly coupled to the injection assembly for moving the injection assembly into and out of the injection position;
    an extraction mechanism cooperating with the cartridge holder and including an extractor movable between an extraction position and a non-use position, the extraction position for piercing the cartridge and extracting the beverage, wherein said extraction mechanism is coupled to said cartridge holder and said extractor moves between a non-use position and an extraction position for piercing the cartridge on a side wall thereof, by moving through an aperture in a side of the cartridge holder proximal a base of the cartridge holder.

11. A beverage dispensing apparatus for extracting beverage from a cartridge, the beverage dispensing apparatus comprising:

a slide assembly including a cartridge holder for receiving the cartridge, the slide assembly for moving the cartridge holder from a loading position to a loaded position;

an injection assembly coupled to the slide assembly, the injection assembly including an injector movable relative to the slide assembly, into and out of an injection position, for piercing the cartridge to inject a liquid into the cartridge;

a driving assembly coupled to the injection assembly for moving the injection assembly into and out of the injection position;

an extraction mechanism cooperating with the cartridge holder and including an extractor movable between an extraction position and a non-use position, the extraction position for piercing the cartridge and extracting the beverage, the direction of movement of the extractor being substantially orthogonal to the direction of movement of the injector, wherein said slide assembly includes a pair of rails with corresponding tracks for sliding therein.

12. The beverage dispensing apparatus according to claim 11, wherein said injection assembly includes guides fastened to respective tracks of the slide assembly.

13. The beverage dispensing apparatus according to claim 12, wherein said injection assembly further includes a sliding plate coupled to said injector, said sliding plate movable in said guides, for moving said injector into and out of said injection position.

14. The beverage dispensing apparatus according to claim 13, wherein the driving assembly includes a cam mechanism cooperating with said sliding plate for moving said plate in said guide, thereby moving said injector into and out of said injection position.

15. The beverage dispensing apparatus according to claim 11, further comprising a cartridge ejector mechanism, fastened to said rails, said ejector mechanism including an ejector biased downwardly for contacting said cartridge when said slide assembly is moved from said loaded position to said loading position, and inhibiting said cartridge from moving when said slide assembly moves from said loaded position into said loading position.

16. The beverage dispensing apparatus according to claim 14, wherein the cartridge holder includes an arch-shaped cavity for receiving the cartridge therein, said ejector for displacing the cartridge from the cavity when moving the slide assembly from the loaded position to the loading position, thereby causing the cartridge to fall from said cartridge holder.

17. A beverage dispensing apparatus for extracting beverage from a cartridge, the beverage dispensing apparatus comprising:

a slide assembly including a cartridge holder for receiving the cartridge, the slide assembly for moving the cartridge holder from a loading position to a loaded position;

an injection assembly coupled to the slide assembly, the injection assembly including an injector movable relative to the slide assembly, into and out of an injection position, for piercing the cartridge to inject a liquid into the cartridge;

a driving assembly coupled to the injection assembly for moving the injection assembly into and out of the injection position;

an extraction mechanism cooperating with the cartridge holder and including an extractor movable between an extraction position and a non-use position, the extraction position for piercing the cartridge and extracting the beverage, said injector being movable into and out of an injection position for piercing a top cover of said beverage cartridge and said injector comprising a tube with a closed end, the tube having a passage therein and outlets in the form of angled slots cut into the side of the tube and in fluid communication with the passage, the outlets for expelling water therefrom, wherein said angled slots diffuse water in a dispersed spray, towards said top cover of said beverage cartridge when said injector is disposed in said cartridge.

18. The beverage dispensing apparatus according to claim 17, further comprising a water supply connected to said injector for providing water thereto, the water supply including an air source for providing air to said injector.

19. The beverage dispensing apparatus according to claim 18, wherein said water supply is configured to provide a predetermined volume of water to said injector, over a controlled time period, followed by pressurized air to said injector.

20. The beverage dispensing apparatus according to claim 19, wherein said water supply includes an adjustment means for adjusting the controlled time period.

* * * * *